United States Patent [19]

Parma

[11] Patent Number: 4,858,979
[45] Date of Patent: Aug. 22, 1989

[54] GRIPPING DEVICE

[75] Inventor: George F. Parma, Stanford, Calif.

[73] Assignee: The United States of America as represented by the Administrator, National Aeronautics and Space Administration, Washington, D.C.

[21] Appl. No.: 221,388

[22] Filed: Jul. 19, 1988

[51] Int. Cl.⁴ .............................................. B25J 15/00
[52] U.S. Cl. ................... 294/106; 294/86.4; 901/38; 901/39
[58] Field of Search .............. 294/106, 81.61, 115, 294/86.4; 414/23, 745.1, 745.7, 917, 736; 901/31, 38, 39

[56] References Cited

U.S. PATENT DOCUMENTS

| | | | |
|---|---|---|---|
| 4,367,893 | 1/1983 | Berg | 294/106 |
| 4,368,913 | 1/1983 | Brockmann et al. | 294/106 |
| 4,403,801 | 9/1983 | Huff et al. | 294/93 |
| 4,572,564 | 2/1986 | Cipolla | 294/88 |
| 4,623,183 | 11/1986 | Aomori | 294/86.4 |

*Primary Examiner*—Robert B. Reeves
*Assistant Examiner*—Dean J. Kramer
*Attorney, Agent, or Firm*—Russell E. Schlorff; John R. Manning; Edward K. Fein

[57] ABSTRACT

A gripping device 10 for providing large moment-carrying capability for handling long cylindrical workpieces W of a wide range of diameters. The device 10, which may be attached as an end effector for a robotic arm, includes two spaced pairs of parallel jaw type gripping members, 87, 102 and 101, 98. Each gripping member includes a gripping pad 110d with a contour which accommodates the grasping of cylindrical objects of different diameters. Movement of the gripping members between a fully open position (FIG. 3) and a fully closed position (FIG. 4) is controlled by a pair of concentrically arranged inner and outer output drive shafts 56, 59, each of which is provided with a pair of arms (81,82 and 83,84) extending in generally opposed radial directions of the shaft axis and to which a gripping member is pivotally attached near its distal end. The gripping device 10 includes a reversible motor 17 and transmission means 20 for simultaneously driving the pair of output drive shafts 56, 59 in counter-rotating directions relative to one another and for reversing their directions of rotation whereby the gripping member of each pair of gripping members may be moved to any position between their fully open and fully closed positions as desired. A mechanical linkage means such as members 81, 87, 89 and pivotally connected structure between pivots 91 and 92 is provided for each said gripping member for maintaining the gripping pads in parallel relationship throughout their range of movement.

19 Claims, 4 Drawing Sheets

GRIPPING DEVICE

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to gripping devices, and more particularly to a gripping device with large moment-carrying capability for handling long workpieces and which can be particularly used as an end effecter on a robotic arm.

BACKGROUND ART

A common type of gripping device is the "scissor" type gripper, which is of simple construction and operation but tends to push the workpiece away as it closes. The standard parallel jaw type gripper which is widely used has been made in a variety of forms but characteristically, this type of gripping device maintains only a single line or point contact with a cylindrical workpiece. If the workpiece is very long or heavy, such a precarious grip makes it difficult or impossible to control and maneuver. In addition, there are numerous other grippers which are contoured to exactly fit the workpiece but have the disadvantage that their suitability is limited to handling only one workpiece diameter or configuration.

U.S. Pat. No. 4,572,564 discloses a robotic adaptive gripping device operationally similar to a workbench vise with parallel clamping surfaces which adjust to fit the shape of the object being grasped and U.S. Pat. No. 4,623,183 discloses a robot hand gripping device utilizing six motors for operation and three concentric shafts which can be rotated independently of each other for orienting three gripper fingers. Each of these devices has little moment-carrying capability. U.S Pat. No. 4,403,801 discloses a clamp assembly having opposed pressurizable gripping cylinders and padded surfaces which enables the clamp to conform to objects of more than one shape. However, it is designed for handling relatively short workpieces and accordingly lacks moment-carrying capability for handling long workpieces. U.S. Pat. No. 4,367,893 discloses a gripping device with three gripping arms driven simultaneously by a single motor to close around a cylindrical object while effecting the centering of the workpiece. The device has a limited capture envelope for shafts restricted by a U-shaped shaft accommodating opening and utilizes three points of contact for grasping rather than multiple lines of contact. U.S. Pat. No. 4,368,913 discloses a parallel jaw type gripping device which employs parallel linkage systems for jaw operation wherein the gripping members are contoured to fit the workpiece and close in a straight line movement. The device has minimal moment-carrying capability.

SUMMARY OF THE INVENTION

The gripping device described herein is designed to provide large moment-carrying capability for handling relatively long workpieces, particularly cylindrical workpieces of circular cross-section and of a wide range of diameters. It is also intended for use as an end effector for a robotic arm in a wide variety of industrial applications and in operations in the environment of outer space or a subsea environment. The gripping device of the invention includes two spaced pairs of parallel jaw type gripping members to facilitate control and maneuvering of long workpieces. Each gripping member includes a gripping pad with a contour which accommodates the grasping of cylindrical objects of different diameters. Movement of the gripping members between a fully open position and a fully closed position is controlled by a pair of concentrically arranged inner and outer output drive shafts, each of which is provided with a pair of arms extending in generally opposed radial directions of the shaft axis and to which a gripping member is pivotally attached near its distal end. The gripping device includes a reversible motor and transmission means for simultaneously driving the pair of output drive shafts in counter-rotating directions relative to one another and for reversing the directions of rotation whereby the pairs of gripping members may be moved to any position between their fully open and fully closed positions as desired. A mechanical linkage means is provided for each said gripping member for maintaining the gripping pads in parallel relationship throughout their range of movement.

DETAILED DESCRIPTION OF THE INVENTION

Figure 1:
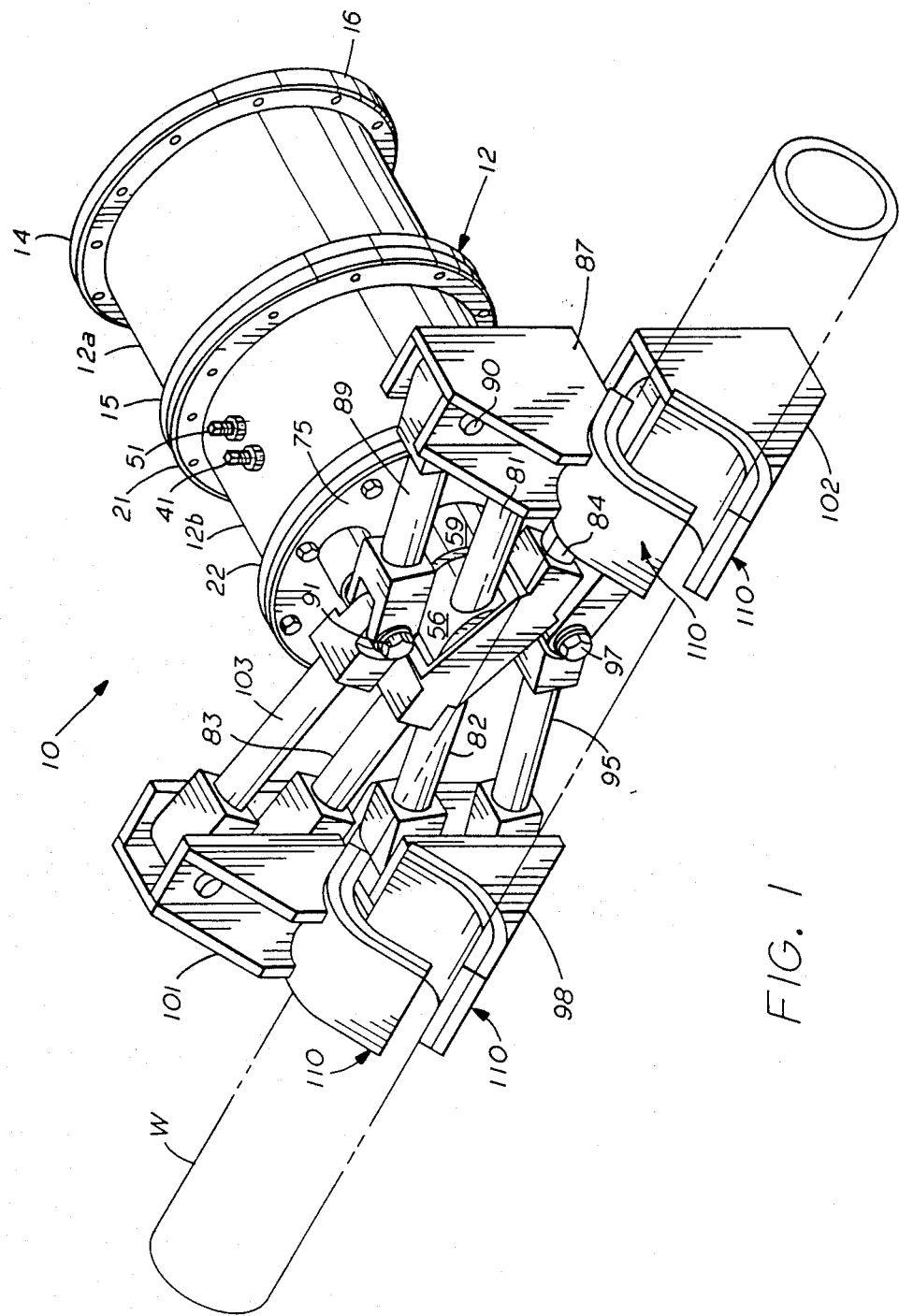
FIG. 1 is a perspective view of a parallel jaw type gripping device representing a preferred embodiment of the invention.
Figure 2:
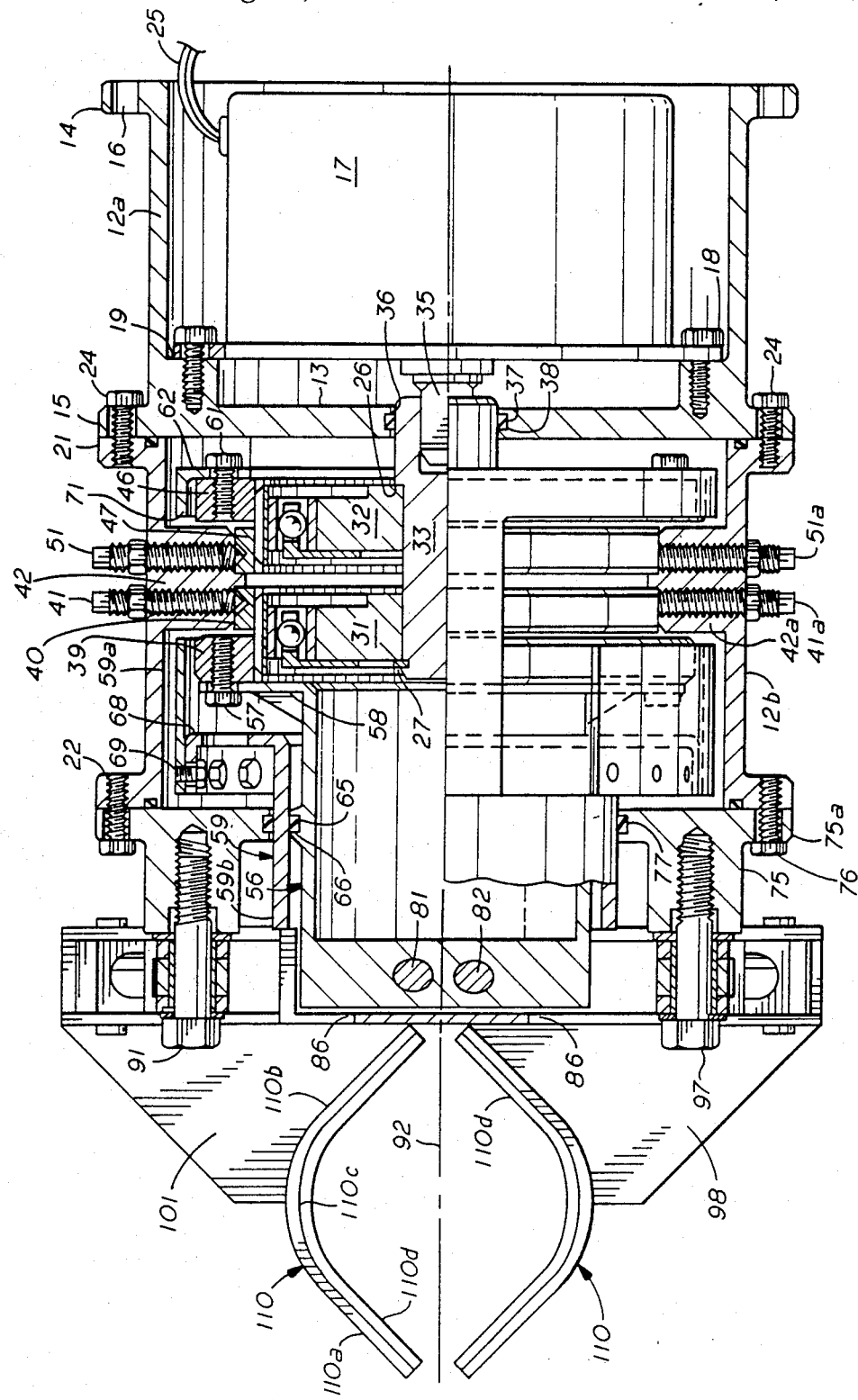
FIG. 2 is a view in longitudinal cross-section of the device of FIG. 1.

Referring more particularly to the drawings, there is shown in FIG. 1, a gripping device 10 which represents a preferred embodiment of the invention. The gripping device 10 comprises a sectional housing 12 of generally cylindrical form and circular cross-section. The housing 12 includes an end section 12a which is open at one end and provided with an end plate 13 at the other. The housing section 12a is provided with annular end flanges 14, 15, each formed with a plurality of circumferentially spaced bolt holes 16 whereby the gripping device 10 is readily adapted for attachment to the distal end of a robotic arm by suitable bolts through the flange 14 at the open end of the housing end section 12a. Referring to FIG. 2, the housing end section 12a encloses a motor 17 which is mounted therein by bolts 18 to an annular shoulder 19 adjacent the closed end of housing section 12a. The motor 17 is preferably a reversible motor which provides power for operation of the gripping device 10 through a harmonic drive transmission system 20 mounted within a central section 12b of the housing 12. The housing section 12b is also provided with end flanges 21, 22 and is connected to the housing 12a in coaxial alignment therewith by bolts 24 through aligned bolt holes provided in the flanges 15 and 21.

Electrical power is supplied to the motor 17 from an appropriate power source (not shown) by means of an electrical cable 25. If the gripping device 10 is intended for use in the environment of outer space, the power supply could be the principal electrical power source of a spacecraft or an auxiliary power supply carried therein.

The harmonic drive system 20 comprises two harmonic drive transmissions 31, 32 mounted in series on a drive shaft 33 which is connected to the motor shaft 35 as an axial extension thereof. The drive shaft 33 extends through a central opening 36 in the end plate 13 and is supported there within an annular bearing 37 seated in an annular groove 38 formed in the wall of the opening 36.

Harmonic drive transmissions typically employ three concentrically arranged components to produce high mechanical advantage and speed reduction. The principle of operation is based on non-rigid body mechanics and controlled elastic deformation of a thin-walled flexible gear referred to as a flexible spline or flexspline. The drive system includes an elliptically shaped wave generator which is fixed directly on a drive shaft and is adapted by its rotation therewith to deform the flexspline, which is disposed concentrically about the elliptical wave generator and provided with gear teeth about its outer periphery. The third principal component is a concentric rigid circular spline of slightly larger diameter than the flexspline and having gear teeth about its inner periphery which are typically two greater in number than the external teeth of the flexspline with which they are adapted to engage. As the wave generator rotates, it deforms and radially deflects the flexspline from its natural shape. The flexspline external teeth are always engaged with the inner teeth of the rigid circular spline in the regions at the ends of the major axis of the elliptical wave generator and as the elliptical wave generator is rotated, it imparts a rotating elliptical shape to the flexspline as its external teeth progressively engage the internal teeth of the circular spline. Since the external teeth of the flexspline are fewer than the teeth of the rigid circular spline, a single revolution of input produces relative motion between these two components equal to two teeth. With the rigid circular spline rotationally fixed, the flexspline rotates in the opposite direction to the input.

Although the flexspline is most often selected as the output, any of the three drive components of a harmonic drive transmission may function as the input, output or fixed member. However, if the circular spline is the output member, the flexspline is the rotationally fixed member and the circular spline rotates in the same direction of rotation as the input.

In the gripping device 10, the harmonic drive transmissions 31, 32 utilize compact "pancake" type gearing of very small axial dimension, as are marketed by Harmonic Drive Division of Quincy Technologies, Inc., Wakefield, Massachusetts. The "pancake" harmonic drive transmissions operate in accordance with the principles described above but further employ a dynamic spline, similar in diameter and in appearance to the circular spline with which it is tandemly disposed. The dynamic spline meshes with the flexspline about which it is concentrically disposed, has an equal number of gear teeth therewith, and is used to transfer output torque from the flexspline to an output shaft. Accordingly, flexspline shape rotation results in tooth engagement/disengagement within the same tooth space so that the dynamic spline rotates at the same speed and in the same direction as the flexspline.

As seen in FIG. 2, the drive transmissions 31, 32 are mounted in tandem with their elliptical wave generator components sleeved over the drive shaft 33 and secured therein between an annular shoulder 26 of shaft 33 and a retaining ring 27. In drive transmission 31, dynamic spline 39 is selected as the rotational output member for transferring output torque from the flexspline to an output drive shaft 56 to which it is connected. In transmission 31, the circular spline 40 is rotationally fixed by means of a screw 41 which extends through a threaded bore through the side wall of the housing section 12b and an inner annular flange or boss 42 provided therein. The screw 41 is inserted to where its tip engages a conical depression 44 formed in a flat surface 45 on the periphery of the circular spline 40 and thereby locks it in place. In transmission 31, the direction of rotation of the output dynamic spline is opposite that of the motor shaft input.

In drive transmission 32, the circular spline 46 is selected as the output member, and the dynamic spline 47 is maintained fixed from rotation. For this purpose, a screw 51 through the wall of housing section 12b and the boss 42 is threaded to where its tip engages a conical depression 52 in a flat 53 formed on the periphery of the dynamic spline 47. In transmission 32, the direction of rotation of the output circular spline is the same as that of the motor shaft input.

The output of transmission 31 is delivered to the drive shaft 56 by means of a bolt connection 57 which bolts the dynamic spline 39 to an annular flange 58 on one end of the drive shaft 56. The output of circular spline 46 of transmission 32 is delivered to a drive shaft 59 by means of a bolt connection 61 which bolts the circular spline 46 to an inward directed annular flange 62 on the end of the drive shaft 59.

As shown in FIG. 2, the drive shafts 56 and 59 are disposed in coaxial sleeved relationship with drive shaft 56 being the inner drive shaft. The shafts 56 and 59 are spaced from one another by an annular bearing 65 mounted in an annular groove 66 provided in the external surface of the inner drive shaft 56. The outer drive shaft 59 has a large diameter cylindrical section 59a disposed about the harmonic drive transmissions 31, 32 and bolted to an end flange 68 of a reduced diameter cylindrical section 59b by a bolt connection 69. To accommodate the screws 41, 51 and the boss 42, the large diameter drive shaft section 59a is formed with an arcuate slot 71 which receives the screws 41, 51 therethrough and is of sufficient angular extent to allow rotation of the outer drive shaft 59 through an arc of approximately 60°.

Figure 7:
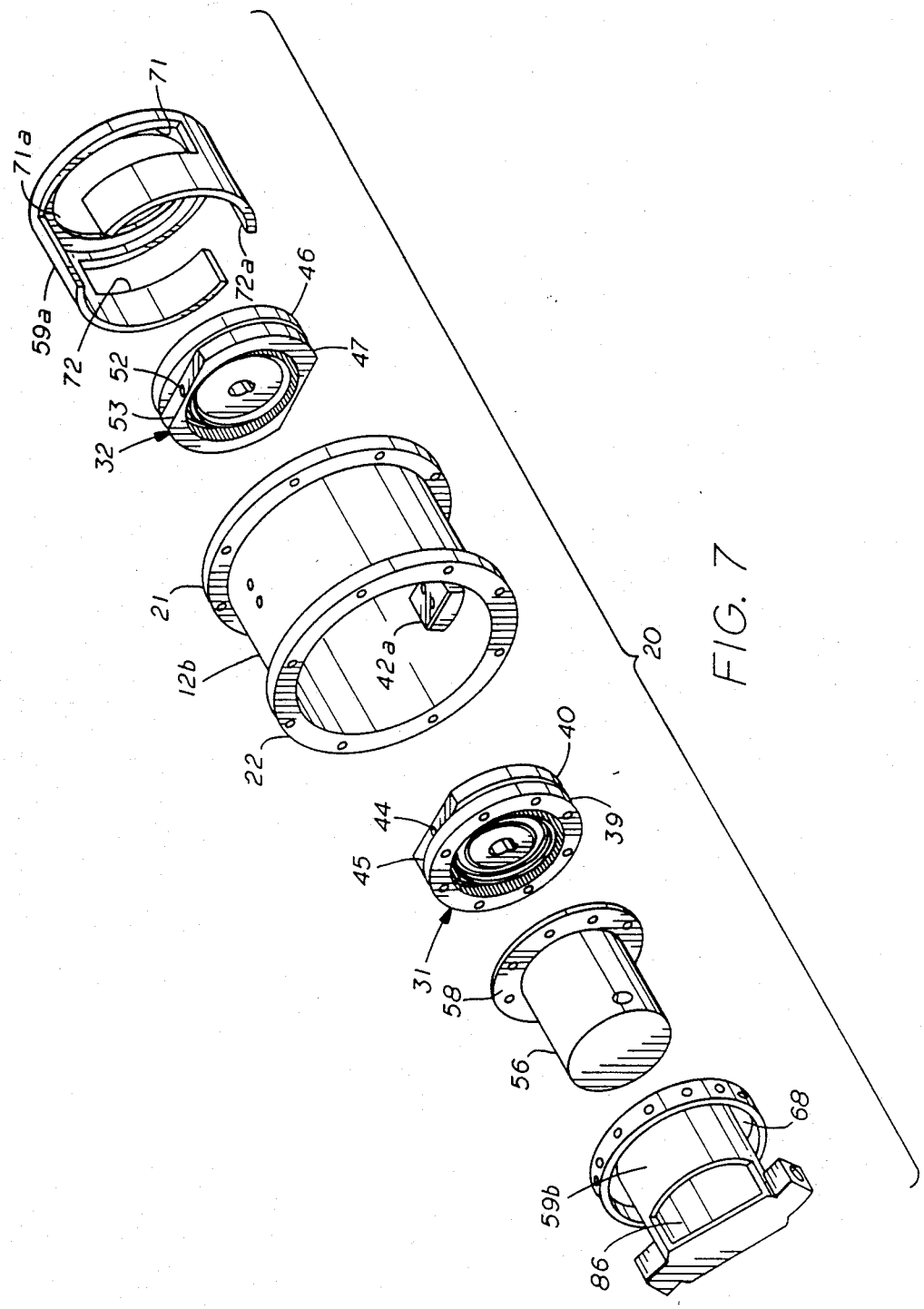
FIG. 7 is an exploded view showing in perspective the principal components of the drive system for the gripping device of FIG. 1.

For purposes of rigidity, additional screws 41a, 51a, and boss 42a are recommended for fixing the circular spline 40 of transmission 31 and the dynamic spline 47 of transmission 32. This, of course, requires provision of an additional arcuate slot 72 through the wall of outer drive shaft section 59a, of the same angular extent as the slot 71 and in diametrically opposed relation. For ease of assembly and manufacture, axial openings 71a, 72a are extended to the slots 71, 72 respectively as best seen in FIG. 7.

As best shown in FIG. 2, the inner and outer drive shafts 56, 59, respectively, extend from the housing 12 through the central opening 73 of an annular adapter 75 which is attached to the housing section 12b by bolts 76 through a flange 75a of adapter 75 and housing flange 22. An annular bearing 77 seated in an annular groove formed in the cylindrical wall defining the central opening 73 engages the external cylindrical surface of the drive shaft 59. Since the output member of transmission 31 rotates in the opposite direction to the input and the output member of transmission 32 rotates in the same direction as the input, the concentric drive shafts 56 and 59 rotate in opposite directions with respect to one another when the motor 17 is energized.

Figure 3:
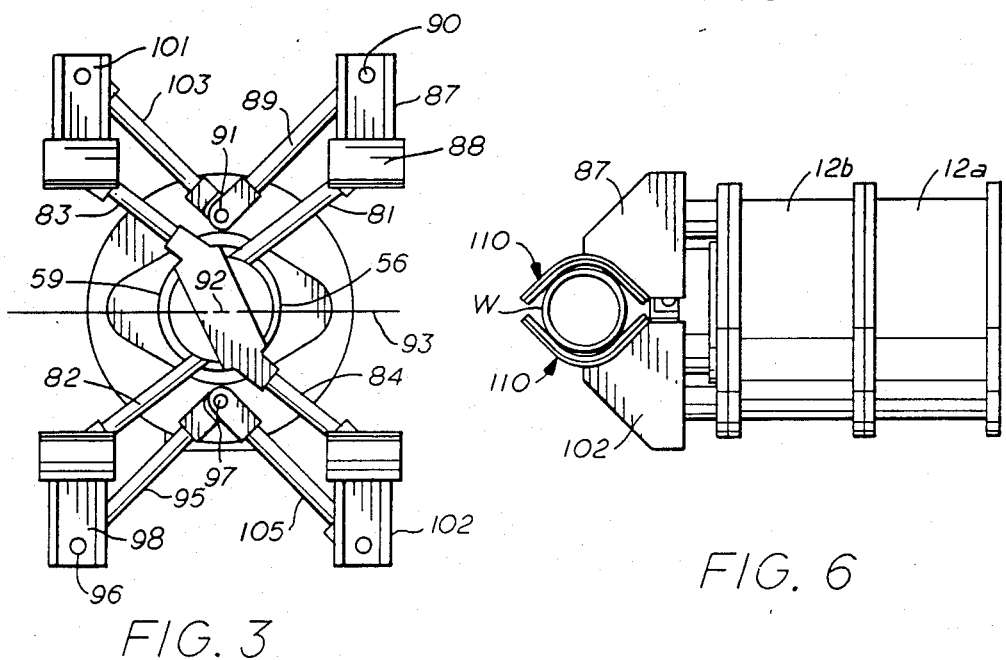
FIG. 3 is a front end view of the device of FIG. 1, showing the gripping jaws of the device in their widest open position.

As best seen in FIGS. 1 and 3, a pair of radiating arms 81, 82 are rigidly attached to and extend from the outer end section of the inner drive shaft 56 and a similar pair of radiating arms 83, 84 extend from the outer end section of the outer drive shaft 59. All of the arms, 81-84, are disposed in the same radial plane with respect to the longitudinal axes of the housing 12 and the drive shafts 56, 59. This feature requires arcuate slots or openings 86 in the wall of the outer drive shaft 59 as shown in FIG. 7 for accommodating the arms 81, 82 radiating outwardly from the inner drive shaft 56.

As shown in FIGS. 1 and 3, the arm 81 extending from the inner drive shaft 56 is pivotally connected to a grip member 87 at a pivot 88 adjacent one end of the member 87. A drag link 89 is pivotally connected at a pivot 90 adjacent the other end of the grip member 87 and also is pivotally connected to a pivot pin 91 which is received in a threaded bore in the adapter 75. The members 81, 87, 89 constitute three links of a four bar linkage, the fourth of which is defined by the structure between the pivot 91 and the central axis 92 of the concentric drive shafts 56, 59, which also serves as a pivot point. The pivot points 88, 90, 91 and axis 92 of the four-bar linkage define a parallelogram so that the grip pad member 87 retains its parallel orientation with respect to a diameter line 93 of the drive shaft 56 as the inner drive shaft 56 is rotated through its allowable angle of rotation.

In similar fashion, a grip member 98 is provided for the arm 82 to which it is pivotally attached adjacent one end thereof at a pivot 94 and to a drag link 95 adjacent its other end, at a pivot 96. A pivot pin 97, affixed to the adapter 75 by a threaded connection therewith, constitutes the fourth pivot point of a four-bar linkage represented by the arm 82, grip member 98, drag link 95 and the structure between the pivot pin 97 and the axis 92.

A grip member 101 is similarly provided and pivotally connected to the arm 83 of outer shaft 59 and a grip member 102 is pivotally affixed to the arm 84 of the outer shaft 59. A drag link 103, pivotally connected to the grip pad member 101 and pivot pin 91,establishes a fourbar linkage which includes the grip member 101.

A drag link 105, between pivot 97 and grip member 102, with the arm 84, grip member 102 and structure between pivot 97 and axis 92 also establishes a four-bar linkage for grip member 102. The pivot points of each of the four-bar linkages with the axis 92 define a parallelogram as in the case of the linkage associated with the arm 81. Accordingly, as the drive shafts 56, 59 are simultaneously rotated, in opposite directions of rotation throughout their limited extent of angular rotation, the grip members retain their orientation with respect to the diameter line 93 with the grip members in each set of opposed grip members, as the set 101, 98 and the set 87, 102 retained parallel throughout their movement.

In FIG. 3, arm 82 of inner shaft 56 and arm 83 of outer shaft 59 are shown in their widest angle of divergence with the grip members 101 and 98 at the maximum separation distance. This position corresponds to the fully open condition of the gripping device 10, as determined by rotational positions of the inner and outer drive shafts 56, 59 at a first extremity of their allowed angular movement.

Figure 4:
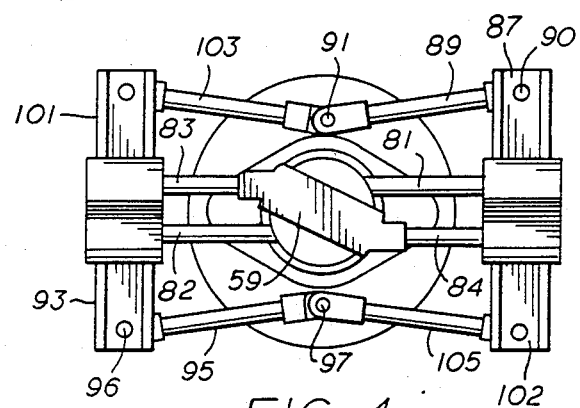
FIG. 4 is a view similar to FIG. 3, showing the gripping jaws of the invention in substantially a fully closed position and grasping an elongate cylindrical workpiece.

In FIG. 4, the arm 82 of inner drive shaft 56 and arm 83 of outer drive shaft 59 are shown in parallel nonangular relationship determined by relative rotational positions of the inner and outer drive shafts 56, 59 at the other extremity of their allowed angular movement, and corresponding to the fully closed condition of the gripping device 10. Arms 81 and 84 are disposed in similar relationship. Accordingly, as the inner and outer concentric drive shafts 56, 59 are rotated from their first extreme position toward their fully closed positions, an elongate workpiece, such as a rod or tube, which is disposed along the diametral line 93 between the grip members, is adapted to be gripped at a first region by the converging grip members 101 and 98, and at a second region by converging grip members 87 and 102. Since there are two widely spaced areas of contact with the workpiece, the gripping device is better able to control and maneuver than conventional gripping devices having a single line or point contact with a workpiece.

Figure 5:
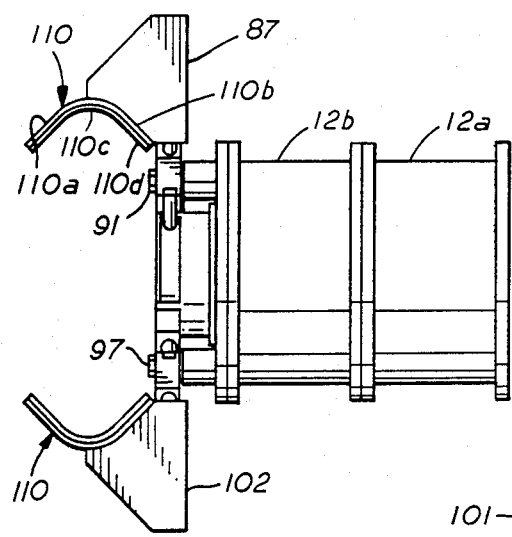
FIG. 5 is a side view of the invention wherein the jaws are in widest open position.

As best seen in FIGS. 2 and 5, each grip member 87, 101, 98 and 102 includes an elongate grip pad support element 110 of trough-like configuration in radial cross-section, the sides 110a, 110b of which are disposed in orthogonal relationship to one another but joined by an arcuate central section 110c of predetermined radius of curvature. This allows the gripping device or end effector 10 to grasp workpieces with diameters larger than the basic radius of section 110c. To prevent damaging the workpiece, and also permitting a firmer grip, a rubber lining or pad 110d is adhesively applied to the inner side of the pad support element 110.

Figure 6:
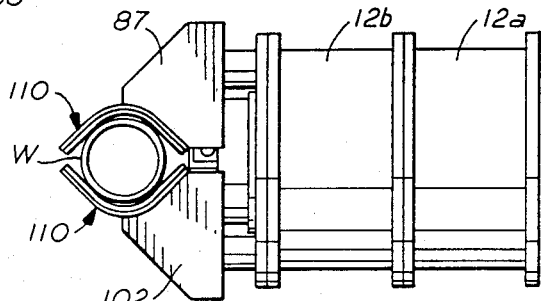
FIG. 6 is a side view, similar to FIG. 5, showing the gripping jaws in firm grasp of a cylindrical workpiece of relatively small diameter.

In FIG. 6, a tubular workpiece W having a radius of curvature substantially equal to or slightly larger than that of an arcuate central section 110c of a grip pad support element 110, is shown tightly gripped by opposing grip pads of grip members 87 and 102. Any workpiece of smaller diameter will only be loosely retained therebetween. Elongate workpieces of larger diameter and greater radius of curvature may nevertheless be firmly grasped along lines of contact with the pads on the sides 110a and 110b of a support element 110 which lines of contact are more distant from the arcuate central section of a gripping pad than are the lines of contact with a smaller diameter workpiece.

There are many ways of energizing the motor 17, but it is preferred that it be energized by an electronic control system for precise control of the direction and duration of its rotation and the angle of rotation of the output drive shafts 56, 59. Since the outputs of the transmissions 31, 32 are in opposite directions of rotation, it will be noted that a clockwise rotation of the inner drive shaft 56 as viewed in FIG. 3 and simultaneous counter clockwise rotation of the outer drive shaft 59, results in the gripping members 87 and 102 moving towards each other to a more closed position as also occurs with the gripping members 101 and 98. Reversing the motor 17 results in the members of each pair moving away from each other. Accordingly, the gripping device 10 can be readily controlled to grip tubular workpieces or rods of different diameters or alternatively, to release them as may be appropriate.

It will therefore be seen that a unique parallel jaw type gripping device is described herein which is particularly suited to be used as an "end effector" on a robotic arm for grasping elongate cylindrical workpieces of circular cross-section. Accordingly, it is well adapted for a wide variety of operations, such as handling oil well drill pipe, or handling building struts in the erection of a space station in the outer space environment. It could, of course, handle elongate workpieces having non-circular cross-sections but it is particularly useful in grasping those of circular cross-section, since it can be used to grip a variety of different diameter workpieces without the necessity of stopping to change end effectors. Further, because of the unique drive system for the invention incorporating a pair of "pancake" type harmonic drive systems and oppositely rotatable concentric drive shafts, the drive system packaging is unusually compact. It would be possible, of course, to use a standard gear box such as a planetary gear box, for achieving gear reduction but in such event, another method of achieving the counter-rotation of the concentric output drive shafts would then be necessary, as for example a system of bevel or spur gears.

Other modifications of the parallel jaw gripping device 10 can be made by adjusting the lengths of the inner and outer drive shaft arms to give the user whatever moment-carrying capability is needed, as may be especially useful for adapting to handling of very long workpieces. Although the radial arms 81–84 in the several four-bar linkages connected to the gripping pad members 87, 102, 98, 101 are disclosed as offset from axis 92, in a modification of device 10, the radial arms extending from each drive shaft can be made collinear with the axis of its associated drive shaft and parallel linkages established without effecting their basic operation.

Modification might also be made to the size and shape of the gripping members 87, 102, 101, 98 to provide greater range of flexibility. For example, the arcuate central section 110c of a pad support element 110 might be made to a very small radius of curvature and the sides 110a, 110b of a pad support element on a gripping member, such as 87, be provided with slots to define fingers which are adapted to mesh with fingers of a corresponding support element 110 on the cooperative gripping member 102. Accordingly, the range of grippable diameters for workpieces can be greatly extended. Furthermore, the motor selected for the invention could be any of a variety of motors, such as a brushless DC servo-controlled motor or a reversible stepper motor.

It is therefore to be understood that this foregoing description of a preferred embodiment of the invention has been presented for purposes of illustration and explanation and is not intended to limit the invention to the precise form disclosed. It is to be appreciated therefore that various structural changes may be made by those skilled in the art without departing from the spirit of the invention.

What is claimed is:

1. A gripping device having relatively large moment-carrying capability which is particularly adapted for use as an end effector of a robotic arm, said gripping device comprising:

a motor including a motor shaft;

a pair of output drive shafts comprising an inner output drive shaft and an outer output drive shaft mounted in coaxial sleeved relationship;

a transmission means connected to the motor shaft for simultaneously driving the pair of output drive shafts in counter-rotating directions relative to one another in response to operation of said motor and cooperable with said motor for controllably reversing the directions of rotation of the counter-rotating drive shafts;

a first pair of arms attached to said inner output drive shaft and extending therefrom in substantially opposed directions;

a second pair of arms attached to said outer output drive shaft and extending therefrom in substantially opposed directions, each said arm of both pairs of arms having a gripping member pivotally attached thereto near the distal end of the arm and disposed in substantially coplanar relationship with all of said gripping members whereby each of said gripping members attached to the arms of the inner output drive shaft is cooperatively associated with a different one of the gripping members on the arms of the outer output drive shaft to form two pairs of cooperative gripping members, each said gripping member being provided with a gripping surface; and means for limiting the rotational movement of each said drive shaft between a first extreme rotational position wherein the gripping pads of each said pair of gripping members are disposed in a widely separated full open position and a second extreme rotational position wherein the gripping pads of each said pair of gripping members are disposed in a closely spaced substantially contacting fully closed position whereby the individual gripping members of said pairs of gripping members are movable in response to operation of said motor to a selected position intermediate said extreme rotational positions for grasping elongate cylindrical workpieces at relatively widely spaced regions of contact or for releasing the workpieces.

2. A gripping device as recited in claim 1 wherein said motor is a reversible motor.

3. A gripping device as recited in claim 1 wherein said motor is a reversible stepping motor.

4. A gripping device as recited in claim 1 wherein said transmission means comprises a pair of harmonic drive transmissions operatively connected to the motor shaft for transferring the torque of the motor shaft to said inner and outer output drive shafts in counter rotating directions relative to one another.

5. A gripping device as recited in claim 4 wherein said harmonic drive transmissions are comprised of axially compact gearing components in coaxial relationship.

6. A gripping device as recited in claim 1 wherein each of said gripping members is provided with a gripping pad having elongate planar surface sections which are convergent to a central connecting surface section having a predetermined radius of curvature, said elongate planar surface sections providing the gripping surfaces of said gripping members.

7. A gripping device as recited in claim 6 further including mechanical linkage means for maintaining the gripping pads in parallel relationship for all allowable rotational positions of the output drive shafts.

8. A gripping device as recited in claim 1 further including a separate mechanical linkage means connected to each said gripping member for maintaining the gripping members in parallel relationship for all allowable rotational positions of the output drive shafts and in equidistant relationship to an axis of symmetry extending between the gripping members of each pair of gripping members.

9. A gripping device as recited in claim 8 further including a housing for said motor and transmission means and wherein each said mechanical linkage means is comprised of four pivotally connected elements including a gripping member, the arm to which it is attached, and a drag link pivotally connected to the gripping member and said housing.

10. A gripping device as recited in claim 7 wherein the faces of said gripping pads are formed of elastic material.

11. A gripping device having relatively large moment-carrying capability which is particularly adapted for use as an end effector of a robotic arm, said gripping device comprising:
 two spaced pairs of parallel jaw type gripping members, each said gripping member being provided with a gripping surface;
 means for controlling movement of the gripping members of each said pair between a fully open position and a closed position, said controlling means comprising a pair of coaxially arranged inner and outer output drive shafts, each of which is provided with a pair of arms extending in opposed generally radial directions of its drive shaft axis with each said arm having a different one of said gripping members attached thereto with said gripping members being equidistant from the common axis of said output drive shafts, and a drive means for simultaneously and controllably driving said output drive shafts in counter-rotating directions; and
 means for maintaining the gripping surfaces of the gripping members in parallel orientation and in equidistant relationship from an axis of symmetry extending between the gripping members of each said pair throughout their range of movement, said gripping device being provided with large moment-carrying capability for grasping elongate workpieces at relatively widely spaced regions of contact.

12. A gripping device as recited in claim 11 wherein said drive means comprises a motor including a motor shaft, and a transmission means connected to the motor shaft for simultaneously driving the pair of output drive shafts in counter-rotating directions relative to one another in response to operation of said motor and cooperable with said motor for controllably reversing the directions of rotation of the counter-rotating drive shafts.

13. A gripping device as recited in claim 12 wherein said motor is a reversible motor.

14. A gripping device as recited in claim 12 wherein said motor is a servo-controlled motor.

15. A gripping device as recited in claim 12 wherein said transmission means comprises a pair of harmonic drive transmissions operatively connected to the motor shaft for transferring the torque of the motor shaft to said inner and outer output drive shafts in counter rotating directions relative to one another.

16. A gripping device as recited in claim 15 wherein said harmonic drive transmissions are comprised of axially compact gearing components in coaxial relationship.

17. A gripping device as recited in claim 11 wherein each of said gripping members is provided with a gripping pad having elongate planar surface sections which are convergent to a central connecting surface section having a predetermined radius of curvature, said elongate planar surface sections providing the gripping surfaces of said gripping members whereby the gripping members are adapted to grasp cylindrical objects of a wide range of diameters.

18. A gripping device as recited in claim 11 wherein said means for maintaining the gripping surfaces of the gripping members in parallel orientation throughout their range of movement includes a housing for said drive means and a separate mechanical linkage means connected to each said gripping member wherein each said mechanical linkage means is comprised of four pivotally connected elements including the gripping member, the arm to which it is attached, and a drag link pivotally connected to the gripping member and said housing.

19. A gripping device as recited in claim 17 wherein the faces of said gripping pads are formed of elastic material.

* * * * *